United States Patent [19]

Junginger et al.

[11] Patent Number: 5,471,342
[45] Date of Patent: Nov. 28, 1995

[54] FIBER OPTICAL AMPLIFIER HAVING A DETECTOR FOR MEASURING SCATTERED LIGHT AT A SPLICE

[75] Inventors: Bernhard Junginger, Herrenberg; Rainer Fritschi; Heinz Krimmel, both of Stuttgart, all of Germany

[73] Assignee: Alcatel N.V., Amsterdam, Netherlands

[21] Appl. No.: 219,990

[22] Filed: Mar. 30, 1994

[30] Foreign Application Priority Data

Mar. 30, 1993 [DE] Germany ............... 43 10 294.8
May 12, 1993 [DE] Germany ............... 43 15 846.3

[51] Int. Cl.⁶ ............... H01S 3/094; H01S 3/17
[52] U.S. Cl. ............... 359/341; 359/177; 285/48
[58] Field of Search ............... 359/110, 134, 359/160, 177, 337, 341; 385/48.50; 250/227.14, 227.15; 356/73.1

[56] References Cited

U.S. PATENT DOCUMENTS

| | | | |
|---|---|---|---|
| 4,963,832 | 10/1990 | Desurvire et al. | 359/341 |
| 5,005,175 | 4/1991 | Desurvire et al. | 359/341 |
| 5,054,876 | 10/1991 | Grasso et al. | 359/341 |
| 5,195,149 | 3/1993 | Pfeiffer et al. | 359/341 |
| 5,229,876 | 7/1993 | Fatehi et al. | 359/160 |
| 5,278,932 | 1/1994 | De Veau et al. | 250/227.14 |
| 5,333,089 | 7/1994 | Heldmann | 359/341 |

FOREIGN PATENT DOCUMENTS

| | | |
|---|---|---|
| 0517503 | 12/1992 | European Pat. Off. . |
| 4028790 | 2/1992 | Germany . |
| 2244595 | 12/1991 | United Kingdom . |

OTHER PUBLICATIONS

"Optical Communications Technology", second issue, Berlin, Heidelberg, New York, Tokyo, springer Publishers, pp. 296–302 by G. Grau.

Primary Examiner—Nelson Moskowitz
Attorney, Agent, or Firm—Ware, Fressola, Van Der Sluys & Adolphson

[57] ABSTRACT

In a fiber-optic amplifier, which consists of at least one pump coupler (2) with a pumping light source (1) and an erbium-doped fiber length (7) which is spliced to the pump coupler (2), at least one detector is located in the splice area (12) between the fiber length (7) and the outgoing transmission line, to monitor the amplifier by measuring the scattered light coming from this splice area (12). An electrical evaluating device follows the detector.

11 Claims, 3 Drawing Sheets

FIBER OPTICAL AMPLIFIER HAVING A DETECTOR FOR MEASURING SCATTERED LIGHT AT A SPLICE

TECHNICAL FIELD

The invention concerns a fiber-optic amplifier of the type consisting of at least one pump coupler with several connecting points, a pumping light source connected to a first connecting point of the pump coupler, and one end of a length of fiber with optical amplifying characteristics connected to another connecting point of the pump coupler, where the free end and another connecting point of the pump coupler serve to connect to optical transmission lines.

BACKGROUND OF THE INVENTION

Such fiber-optic amplifiers are especially used in optical telecommunication systems. They are inserted into optical transmission lines and amplify the signal light conducted in the transmission line. To control the light output, it is desirable to measure the input or the output of the amplifier, for example.

Fiber-optic amplifiers are known from two articles in the "Journal of LIGHTWAVE TECHNOLOGY", February 1991, Vol. 9 no. 2, pages 261 to 265 and pages 291 to 296, in which the signal or pump output is detected by a branch on the output side of the pump coupler. According to the pump coupler being used, it can be polarization- or wavelength-dependent. However, only one detector can be located on the monitor arm of the pump coupler.

From the publication "Optical Amplifiers and Their Applications, 1992 Technical Digest (Optical Society of America, Washington, DC, 1992), Vol. 17, pages ThA4-1/91 to ThA4-4/94", it is known to splice separate measuring couplers to the input and/or output of the fiber-optic amplifier, and to detect the light output coupled out in one branch. This is due to the requirement placed on the optical transmission systems, that the transmission line must be optically safe, i.e. at no time can the eye of a person who intentionally or unintentionally looks into a disconnected optical fiber, be in danger. To ensure this, the system, or individual system components, must be shut off in the event of a fiber breakage.

An interruption of the transmission line can be detected by monitoring the input light level of a fiber-optic amplifier, for example because the lack of input light can mean that the transmission line has been interrupted upstream of this fiber-optic amplifier.

From the above cited literature it is known to monitor the input light level of a fiber-optic amplifier. There, a portion of the input light level is coupled out by a coupler, which is part of the fiber-optic amplifier, and detected by a photodiode. The signal-to-noise ratio is degraded, since the amplifying part of the fiber-optic amplifier has less light output available, and the insertion of the coupler causes additional attenuation. Furthermore, this coupler creates additional material and labor costs.

SUMMARY OF THE INVENTION

The invention has the task of creating a fiber-optic amplifier with a device that allows in a simple way to monitor the light output, which enters and/or exits the core of the fiber doped with a rare earth element. The invention fulfills this task by a fiber-optic amplifier consisting of at least one pump coupler with several connecting points, a pumping light source connected to a first connecting point of the pump coupler, and one end of a length of fiber with optical amplifying characteristics connected to another connecting point of the pump coupler, where the free end and another connecting point of the pump coupler serve to connect to optical transmission lines characterized in that at least one end of the length of fiber with amplifying characteristics has at least one detector pointed at the splice area, to measure scattered light leaking from splice area. An advantageous configuration of the invention is such as fiber optic amplifier characterized in that several detectors are pointed at the splice area located at each end of the length of fiber.

Another advantage of the invention is that the detector converts pump light contained in the scattered light into electrical signals and where the detector is preceded by means that only let pump light pass.

The invention is also characterized by a fiber-optic amplifier where the detector is supplied to an evaluating device, and that the evaluating device shuts the fiber-optic amplifier off when the detector signal exceeds a predetermined threshold value.

It is further characterized where one detector is assigned to the input or the output side splice of the length of fiber, depending on the direction in which the signal light propagates.

Other advantageous features the invention will in part be obvious and will in part be described below.

The invention utilizes to advantage the effect known from DE 40 28 790 C1, that at an interface between two optical waveguides, detectable light output is radiated from a cross sectional branch of the cores. When the effect is used, it is an advantage that no fiber manipulation is necessary with fiber-optic amplifiers, because as a rule the fibers of which the pump coupler is made have a different mode field diameter than the erbium-doped length of fiber.

BRIEF DESCRIPTION OF THE DRAWINGS

In the following, the invention will be described in more detail by means of the drawings, in which.

BEST MODE FOR CARRYING OUT THE INVENTION

Figure 1:
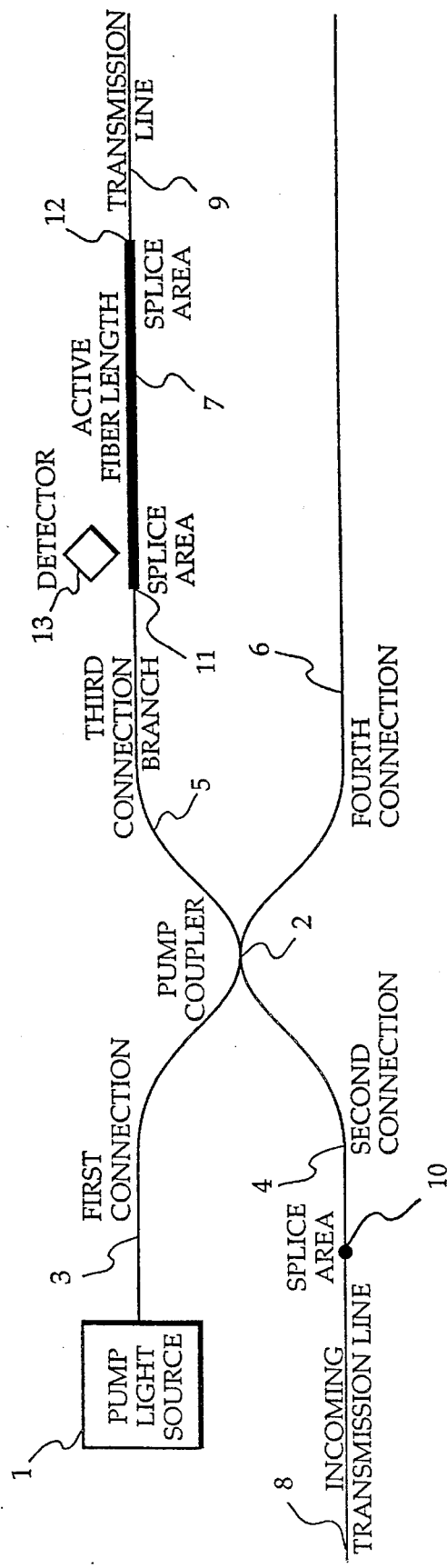
FIG. 1 is a configuration example of a fiber-optic amplifier shown in schematic form.

The fiber-optic amplifier consists of a pumping light source 1, a pump coupler 2 with four connections or ports 3 to 6, and a length of fiber, which is doped with erbium for example, hereafter called an active fiber length. The first connection 3 of the pump coupler 2 is joined to the pumping light source 1, the second connection 4 to the optical waveguide of an incoming transmission line 8, and the third connection 5 is joined to one end 11 of the active fiber length 7, whose other conducting end 12 is connected to the optical waveguide of an outgoing transmission line 9. In this instance, the potential fourth connection 6 of the pump coupler remains free.

In the fiber-optic amplifier, the active ions in the fiber length 7 are excited by pump light P1 emitted by the pumping light source 1, in order to subsequently amplify the light waves of the signal light S1 supplied by the incoming transmission line 8. In this instance, the optical waveguides of the incoming and outgoing transmission lines 8, 9 consist of commercial single-mode standard fibers with 9 μm core diameter and 125 μm cladding diameter. If necessary, a fiber splice or a connector can be provided between the incoming transmission line 8 and the pump coupler 2. The joint of the third connection 5 of pump coupler 2 to the active fiber length 7, and its joint to the outgoing transmission line 9, are preferably splices.

When the fiber-optic amplifier is operating, the pump light causes the erbium ions to go from an unexcited to an excited condition, from which they return to the unexecuted condition either by spontaneous or by stimulated emission. The stimulated emission is excited by the optical signal which passes through the active fiber length 7 and is amplified. The spontaneous emission is also amplified in the fiber length 7; this amplified spontaneous emission (ASE) is responsible for the noise that occurs in a fiber-optic amplifier.

Figure 3:
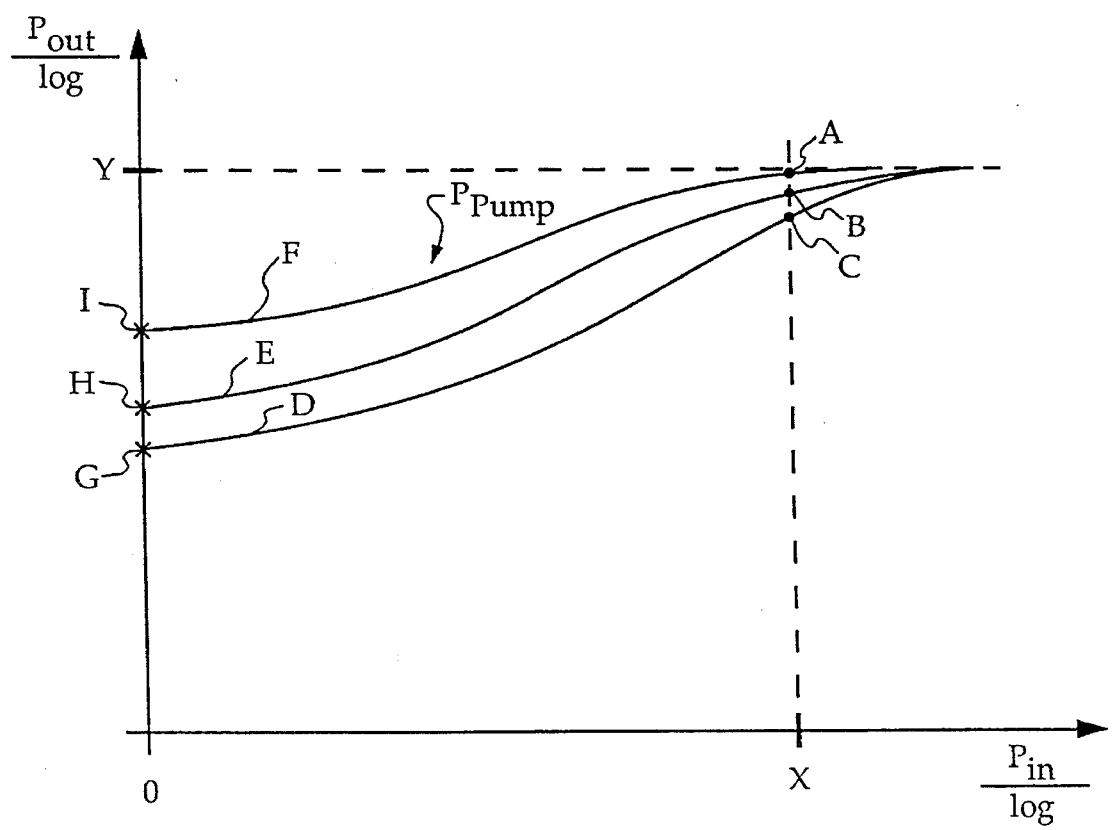
FIG. 3 is a diagram of the dependence of the output light level on the input light level of a fiber-optic amplifier with pumping power as the parameter.

The optical signal being amplified enters the fiber-optic amplifier with an input light level $P_{in}$ and exits from there with an output light level $P_{out}$. The relationship between the entire light output, in other words the sum of the signal level, the amplified spontaneous emission and the input light level is illustrated in FIG. 3, with the pump output $P_{pump}$ as the parameter. Three curves are shown, which correspond to three different pump outputs, where the pump output rises beginning with curve D, through curve F. An input light level marked by X, and an output light level marked by Y are assumed, which correspond to a desired condition. An indicated point A corresponds to this desired condition. The conditions that deviate from the desired condition are identified by points B, C. If the level of the input light received by the fiber-optic amplifier is too low, an output light level is detected, which practically corresponds to the output of the noise caused by the spontaneous emission (ASE). This is also indicated in FIG. 3 by points G, H and I.

The following relationship results:

The output light level increases with increasing input light level, the output light level also increases with increasing pump output, i.e. at a predetermined input light level, the output light level increases with increasing pump output.

The pump output is determined by the current at which the pumping light source operates.

The relationship can be utilized, so that by detecting the output light level, a conclusion can be formulated about the input light level. Any deviation from the desired condition by the output level of the signal light at constant pump output, indicates a change in the input light level.

If the deviation falls short of a specified threshold value, it means that no or very little input light level is being supplied, and the fiber-optic amplifier or the system must be switched off.

The unabsorbed pumped light at the output can also be utilized to test whether a signal is present at the input. Much pumped light is absorbed if a sufficiently strong signal is available at the incoming uninterrupted fiber length; if the signal is too weak, very little pumped light is absorbed. A safety switch, which turns the amplifier off when necessary, is therefore provided as follows. First, during manufacture of the amplifier, the relationship between the residual pump output and the current of the pumping light source 1 is measured and stored in an evaluating device, for example a microcomputer. If the pumped light available at the output during operation is measured, and its intensity exceeds the stored value by a predetermined factor, the input signal fails and the amplifier is switched off. The threshold value is established by the predetermined factor.

The active fiber length 7 usually has the same cladding diameter as standard fibers, but its core has a smaller diameter. For that reason, a step in the cross section, which changes the core diameter, is provided in the splice area 11 between pump coupler 2 (third connection 5) and the active fiber length 7, as well as in splice area 12 between the active fiber length 7 and outgoing transmission line 9, where light scatters during the fiber amplifier operation. Although only a small percentage of the light in the fiber length leaks out, it can be detected and effectively evaluated.

The following measurements can be performed in the splice areas:

1. Splice area 11 at the fiber-optic amplifier 7 input:

1a) Measurement of the signal light at the input side.

1) Measurement of the pump light at the input side.

1c) Measurement of the backward flowing light in the signal wavelength area.

1d) Measurement of the backward flowing pump light.

2. Splice area 12 at the fiber-optic amplifier 7 output:

2a) Measurement of the light at the output side in the signal wavelength area.

2b) Measurement of the pump light at the output side (not absorbed by the fiber 7).

2c) Measurement of the backward flowing light in the signal wavelength area.

3. Splice area 10 at the input to the pump coupler 2:

3a) Measurement of the forward flowing light in the signal wavelength area.

3b) Measurement of the backward flowing light in the signal wavelength area.

These measured light intensities can be evaluated by an evaluating device, and utilized as follows for control, for example.

Measurement 1a) and 3a)

The fiber-optic amplifier is switched off if the light intensity falls short of the specified threshold value.

Measurement 1b)

The measured light intensity can be used for monitoring and adjusting the pumping light source.

Measurement 2a)

1. The fiber-optic amplifier is switched off if the measured light intensity falls short of a specified threshold value.

2. Acquisition of the measured value for adjustment of the output.

Measurement 2b)

The fiber-optic amplifier is switched off if the measured light intensity exceeds a specified threshold value.

Measurement 2c)

Measuring the reflection of the transmission line.

In principle, the measurements 1a–1d, 2a–2c and 3a and 3b are made in the same way. The following explains the measurements 1a and 1b in more detail.

Figure 2:
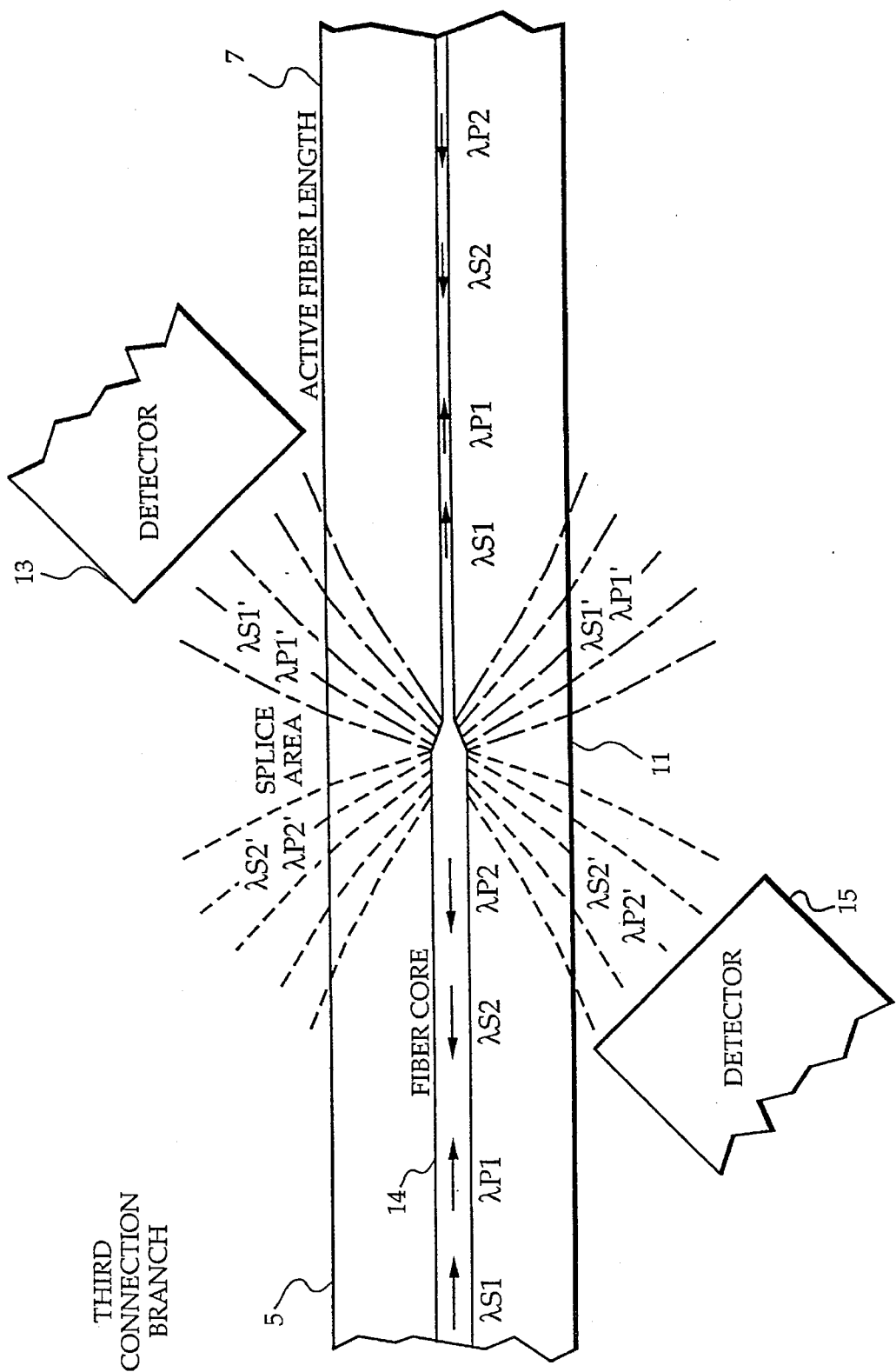
FIG. 2 is a schematic illustration of an enlarged section of an amplifier splice in FIG. 1, with detectors pointing in its direction.

To measure the light from the fiber core 14 scattered at an acute angle in the direction of the expansion, at least one detector 13 is provided and directed towards the splice area (e.g. 11), at least at one end of the active fiber length 7. It is possible to measure the existing pump light, the existing signal light, or the pump and signal light. As in FIG. 2, the configuration example of the fiber-optic amplifier in FIG. 1 shows that the signal light S1 from the incoming transmission line 8, and the pump light P1 emitted by the pumping light source 1, are joined in pump coupler 2 and are then supplied to the active fiber length 7 by a branch (connection 5) of the pump coupler 2. The signal light S1 is amplified in the active fiber length 7, and continues through the outgoing transmission line 9. The scattered signal light S1' and the scattered pump light P1' are output radially in the splice area 11 between the pump coupler connection 5 and the active fiber length 7. For that reason, placing a corresponding wavelength-selective detector 13, or some means consisting of filters which are located upstream of detector 13, 15 and only allow signal or pump light to pass, enables it to acquire either scattered pump light P1' or scattered signal light S1', convert it into electrical detector signals, and supply it to an evaluating device (not illustrated).

In order to receive as much scattered P1', S1' light as possible, the detectors are located so that the light-receiving side of their housing is directly placed against the splice.

If the signal input and signal output (fiber input 9, fiber output 8) are interchanged with respect to FIG. 1, the measurements that refer to the signal wavelength are interchanged accordingly. The same statement applies here as well, that no signal light is available at the input (fiber 9) of the fiber-optic amplifier if the remaining pump light, measured at splice 12, exceeds a threshold value.

If the optical transmission system functions bidirectionally, the same measures are required for both transmission directions.

We claim:

1. A fiber-optic amplifier connectable to a transmission line (9), consisting of a pump coupler with several connecting points, a pumping light source connected to a first connecting point of the pump coupler, a length (7) of fiber having optical amplifying characteristics with one end being joined to a second connecting point of the pump coupler defining one splice area (11) and with another end to be joined to the transmission line (9) defining another splice area (12), and at least one detector (13, 15) being arranged at at least one end of the length (7) of fiber with optical amplifying characteristics and being pointed at a respective splice area (11, 12) to measure scattered light (S1', P1', S2', P2') leaking from the respective splice area (11, 12).

2. A fiber-optic amplifier as in claim 1, characterized in that several detectors (13, 15) are pointed at the splice area (11, 12) located at each end of the length of fiber (7).

3. A fiber-optic amplifier as in claim 1, characterized in that the detector (13, 15) converts pump light (P1, P2) contained in the scattered light (P1', P2') into electrical signals.

4. A fiber-optic amplifier as in claim 3, characterized in that the detector (13, 15) is preceded by means that only let pump light (P1, P2) pass.

5. A fiber-optic amplifier as in claim 4, characterized in that the output signal from the detector (13, 15) is supplied to an evaluating device, and that the evaluating device shuts the fiber-optic amplifier off when the detector signal exceeds a predetermined threshold value.

6. A fiber-optic amplifier as in claim 1, characterized in that at least the one detector (13, 15) is assigned to the input or the output side splice (12) of the length of fiber (7), depending on the direction in which the signal light propagates.

7. A fiber-optic amplifier as in claim 6, characterized in that the detector (13, 15) converts signal light (S1, S2) contained in the scattered light (S1, S2) into electric signals.

8. A fiber-optic amplifier as in claim 7, characterized in that the detector (13, 15) is preceded by means that only let signal light (S1, S2) pass.

9. A fiber-optic amplifier as in claim 8, characterized in that the output signal from the detector (13, 15) is supplied to an evaluating device, and that the evaluating device shuts the fiber-optic amplifier off when the detector signal falls below a predetermined threshold value.

10. A fiber-optic amplifier as in claim 1, characterized in that at least the one detector (13, 15) is assigned to one output side splice (10, 11 or 12) of the length of fiber (7), depending on the direction in which the signal light propagates.

11. A fiber-optic amplifier, comprising:

a pump coupler (2) with several connecting points, including a first connecting point and a second connecting point;

a pump light source (1) connected to the first connecting point of the pump coupler (2);

a length of fiber with optical amplifying characteristics (7);

a splice area (11) formed where an end of the length of fiber with optical amplifying characteristics (7) joins the second connecting point of the pump coupler(2); and at least one detector (13, 15) arranged adjacent the splice area (11) for measuring scattered light (S1', P1', S2', P2') leaking from the splice area (11).

* * * * *